(12) United States Patent
Al-Maaitah

(10) Patent No.: US 9,772,121 B1
(45) Date of Patent: Sep. 26, 2017

(54) METHOD AND APPARATUS FOR TRACKING AND CONCENTRATING ELECTROMAGNETIC WAVES COMING FROM A MOVING SOURCE TO A FIXED FOCAL POINT

(71) Applicant: Adnan Ayman Al-Maaitah, Amman (JO)

(72) Inventor: Adnan Ayman Al-Maaitah, Amman (JO)

( * ) Notice: Subject to any disclaimer, the term of this patent is extended or adjusted under 35 U.S.C. 154(b) by 62 days.

(21) Appl. No.: 14/262,985

(22) Filed: Apr. 28, 2014

(51) Int. Cl.
| | |
|---|---|
| *F24J 2/38* | (2014.01) |
| *F03G 6/06* | (2006.01) |
| *F03G 6/04* | (2006.01) |
| *F24J 2/40* | (2006.01) |

(52) U.S. Cl.
CPC .... *F24J 2/38* (2013.01); *F03G 6/04* (2013.01); *F03G 6/06* (2013.01); *F03G 6/064* (2013.01); *F03G 6/068* (2013.01); *F24J 2/40* (2013.01); *F03G 2006/062* (2013.01)

(58) Field of Classification Search
CPC ...... F24J 2/38; F24J 2/40; F03G 6/064; F03G 6/04; F03G 6/068; F03G 6/06; F03G 2006/062
USPC .............. 60/641.8–641.15; 126/600–608
See application file for complete search history.

(56) References Cited

U.S. PATENT DOCUMENTS

| | | | |
|---|---|---|---|
| 4,111,184 A | 9/1978 | Fletcher | |
| 4,252,107 A * | 2/1981 | Horton | F24J 2/07 |
| | | | 126/605 |
| 4,449,515 A | 5/1984 | Nilsson | |
| 4,548,195 A | 10/1985 | Balhorn | |
| 4,586,334 A * | 5/1986 | Nilsson, Sr. | F02G 1/043 |
| | | | 165/96 |
| 4,781,174 A * | 11/1988 | Gardner | E04H 13/008 |
| | | | 110/194 |
| 4,870,949 A * | 10/1989 | Butler | F24J 2/12 |
| | | | 126/571 |
| 4,875,467 A * | 10/1989 | Murphy | F24J 2/125 |
| | | | 126/600 |
| 5,325,844 A | 7/1994 | Rogers et al. | |
| 8,272,216 B2 * | 9/2012 | Nakamura | C01B 3/042 |
| | | | 123/3 |

(Continued)

FOREIGN PATENT DOCUMENTS

WO     2013/112362 A1     8/2013

*Primary Examiner* — Hoang Nguyen
(74) *Attorney, Agent, or Firm* — Law Office of Heena N. Kampani; Heena Kampani

(57) ABSTRACT

Methods and apparatus for concentrating electromagnetic waves coming from a moving source at a focal point fixed to the ground. The invention discloses a tracking system for a device capable of concentrating incoming electromagnetic waves at a fixed focal point. This concentration of the electromagnetic waves may be done by reflection, as in the case of a reflecting dish, or by refraction as in the case of a concentrating lens, which is impeded in a hemisphere, which can be real or imaginary, such that its focal point coincides with the center of the hemisphere and using this apparatus to track such moving source by rotating around said hemisphere's fixed center, so as to face the incoming electromagnetic rays normally. A receiver can be kept at the focal point of the device which uses the concentrated rays for various applications such as melting metals or charging a solar cell.

10 Claims, 7 Drawing Sheets

(56) References Cited

U.S. PATENT DOCUMENTS

| | | | | |
|---|---|---|---|---|
| 2008/0121755 A1* | 5/2008 | Bennett | | B64C 39/024 244/59 |
| 2008/0184989 A1* | 8/2008 | Mecham | | F02C 1/05 126/583 |
| 2009/0194145 A1* | 8/2009 | Kribus | | F24J 2/12 136/248 |
| 2009/0314280 A1 | 12/2009 | Banerjee | | |
| 2010/0000874 A1 | 1/2010 | Hinman et al. | | |
| 2010/0024801 A1* | 2/2010 | Lin | | F24J 2/07 126/593 |
| 2010/0206295 A1* | 8/2010 | Xiang | | F24J 2/12 126/601 |
| 2010/0206296 A1* | 8/2010 | Matalon | | F24J 2/0483 126/605 |
| 2010/0326425 A1* | 12/2010 | Detch | | F24J 2/12 126/600 |
| 2011/0186041 A1* | 8/2011 | Kalina | | F24J 2/541 126/601 |
| 2012/0017888 A1* | 1/2012 | Garza | | F24J 2/06 126/678 |
| 2012/0266938 A1* | 10/2012 | Goei | | F24J 2/38 136/246 |
| 2013/0098354 A1 | 4/2013 | Kummamuru | | |
| 2013/0147196 A1 | 6/2013 | Wieghardt | | |
| 2013/0257056 A1* | 10/2013 | Ma | | F03G 6/065 290/52 |
| 2014/0251308 A1 | 9/2014 | Wyle et al. | | |

* cited by examiner

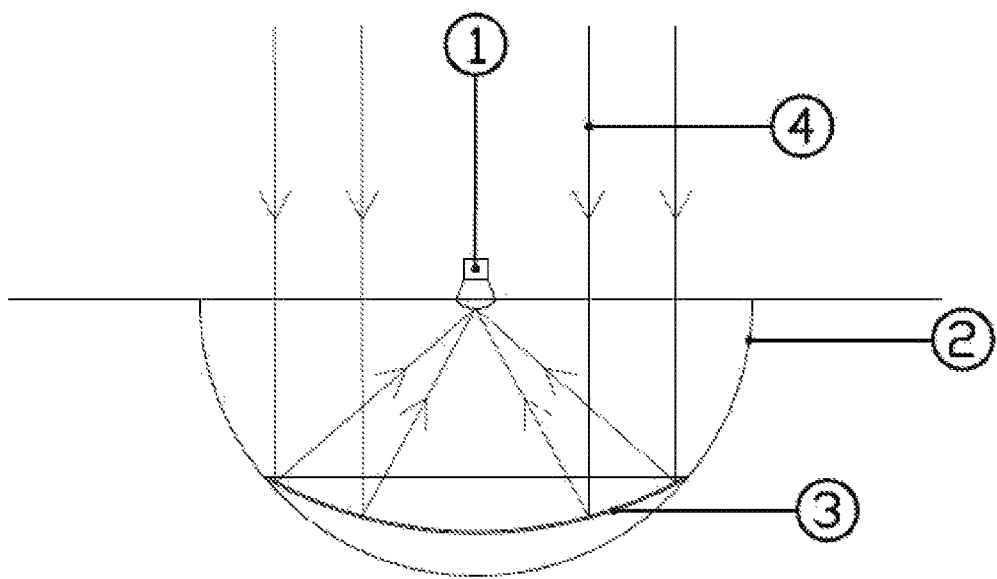
Fig. 2.a

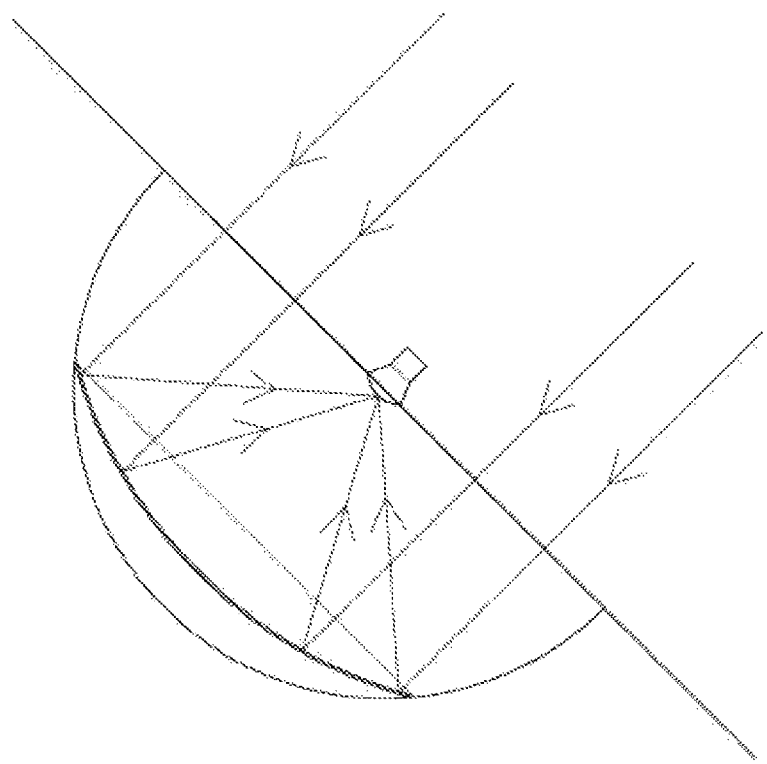
Fig. 2.b

METHOD AND APPARATUS FOR TRACKING AND CONCENTRATING ELECTROMAGNETIC WAVES COMING FROM A MOVING SOURCE TO A FIXED FOCAL POINT

TECHNICAL FIELD OF THE INVENTION

The present invention relates to a method and apparatus for concentrating electromagnetic waves coming from a moving source at a focal point fixed to the ground. The invention discloses a tracking system for a device capable of concentrating incoming electromagnetic waves at a fixed focal point. This concentration of the electromagnetic waves may be done by reflection, as in the case of a reflecting dish, or by refraction as in the case of a concentrating lens. Embodiments of the invention are also specifically designed where the electromagnetic radiation source is the Sun. Embodiments are also disclosed detailing the process and apparatus allowing the electromagnetic wave concentration device to move in order to track the moving source while keeping the focal point of concentration fixed to the ground.

BACKGROUND OF THE INVENTION

There are existing devices that can concentrate incoming electromagnetic waves, such as light and telecommunication signals, to their respective focal points when the electromagnetic waves fall normal to their apertures. Such devices have been used for a long time in Solar Energy Concentration to concentrate solar beams on the focal point and in telecommunication to concentrate the signal to the receiver device at the focal point.

In solar applications, the concentrating reflecting solar parabolic dish and concentrating lens have many important characteristics, such as high concentration resulting in a very high receiver temperatures or a high Photovoltaic (PV) efficiency. Similarly, a lens (either smooth or Fresnel lens) can be used to concentrate light and solar beams to the focal point. There are available commercial products in the market where the Parabolic Dish tracks sun automatically and the resulting high temperature is used to operate a Sterling Engine for example or to concentrate the sun on a CPV (Concentrating Photo Voltaic). In some cases the high temperature can be used to melt metals at the receiver.

The receiver has to move as the dish or lens changes its angle to track the signal or the sun. Similarly, this is the case in all solar concentrating lenses where the focal point in all existing devices changes position as the lenses track the sun. This imposes many limitation to the applications of the Parabolic Dish or lens concentrators especially if the receiver is heavy or has to have flow of materials to it and (or) from it. In Solar Parabolic Dish Concentrators, for example, the sterling engine weight is a major constrain along with the wind load which limit the capacity of the largest existing Solar Parabolic Dish electricity generation to 25 KW.

A complicated tracking mechanism is needed to concentrate the solar beam or the signal to a focal point fixed to the ground. One attempt in solving this issue was by having a linear collector fixed to the ground with pivoting concentrator that change in angle. However, in that prior art the focal point keep changing along the receiver. Some prior arts teach about tracking devices where the parabolic dish rotates around a fixed platform to the ground. Although various electromagnetic wave front concentrators are known to the art, all, or almost all of them suffer from one or more than one disadvantage. All of these devices have a focal point that is moving as the dish or the lens track the sun. Therefore, there is a need to provide methods and apparatus for fixing the focal point to the ground while tracking and concentrating the incoming waves.

The present invention illustrates a method and apparatus for tracking and concentrating electromagnetic waves coming from a moving source at a focal point fixed to the ground. The invention discloses a tracking system for a device capable of concentrating incoming electromagnetic waves at a fixed focal point. One embodiment of such invention is used for tracking and concentration of incoming solar waves.

BRIEF SUMMARY OF THE INVENTION

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

The present invention relates to a method and apparatus for tracking and concentrating electromagnetic waves coming from a moving source at a focal point fixed to the ground. The invention discloses a tracking system for a device capable of concentrating incoming electromagnetic waves at a fixed focal point. This concentration of the electromagnetic waves may be done by reflection, as in the case of a reflecting dish, or by refraction as in the case of a concentrating lens. Embodiments of the invention are also specifically designed where the electromagnetic radiation source is the Sun. Embodiments are also disclosed detailing the process and apparatus allowing the electromagnetic wave concentration device to move in order to track the moving source while keeping the focal point of concentration fixed to the ground.

Embodiments of the present invention involve a reflecting parabolic dish or a concentrating lens as the electromagnetic wave concentration device. Aspects of the present invention further reside in methods and a tracking system for the parabolic dish or concentrating lens to track the sun or any incoming signal while concentrating the solar beam or the signal onto a focal point fixed to the ground. The electromagnetic wave concentration device, for example but not limited to the parabolic dish or the concentrating lens, is impeded in a hemisphere (which can fictional for convenience or real) where the focal point of the dish or the lens coincides with the center of the hemisphere. Hence, if the hemisphere rotated around its center while facing the solar beam (or the incoming signal) normally the parabolic dish or the concentrating lens will always concentrate the beam to the fixed focal point. Based on this principle a practical tracking system concentrating electromagnetic waves is presented and designed to be easily built for a parabolic dish and concentrating lens that always focuses the solar beam, telecommunication signals and other electromagnetic waves on a focal point fixed to the ground. Applications of such invention is for continuous metal melting by solar energy, hydrogen production form water by high temperature concentrated solar energy, high efficiency combined cycle by concentrated solar power, and large scale Sterling engine powered by parabolic dish.

Various objects, features, aspects, and advantages of the present invention will become more apparent from the following detailed description of preferred embodiments of

BRIEF DESCRIPTION OF THE DRAWINGS

FIG. 2.a is a demonstration of one aspect of the first embodiment showing how the parabolic dish is impeded in a Hemisphere facing solar beam normally concentrates the beam to the focal point.

FIG. 2.b is a demonstration of the fact that as the Hemisphere (2) in FIG. 2.a rotates around its fixed center to track the solar beam and faces it normally, the device will continue to concentrate the solar beam to the fixed focal point.

DETAILED DESCRIPTION

The particular values and configurations discussed in these non-limiting examples can be varied and are cited merely to illustrate at least one embodiment and are not intended to limit the scope thereof.

The present invention illustrates methods and apparatus for concentrating electromagnetic waves originating from a moving source to a fixed focal point by using an electromagnetic wave concentrating device, such as a reflecting parabolic dish or a concentrating lens which concentrates incoming normal electromagnetic waves to its focal point and impeding such device into a hemisphere (which can be real or imaginary) such that its focal point coincides with the centre of the hemisphere. The hemisphere can rotate about its fixed centre and this apparatus can track a moving electromagnetic wave source by rotating around said hemisphere's fixed centre, so as to face the incoming electromagnetic rays normally. Hence, if the hemisphere is rotated around its center while facing the electromagnetic wave (or the incoming signal) normally, the device will always concentrate the beam to the focal point fixed with respect to ground. The exemplary embodiments of the present invention are described by taking parabolic dish and lens as examples of the optical devices. The parabolic dish or lens impeded in the hemisphere always focus the solar beam, telecommunication signals and other electromagnetic wave fronts on a focal point fixed to the ground.

Figure 1:
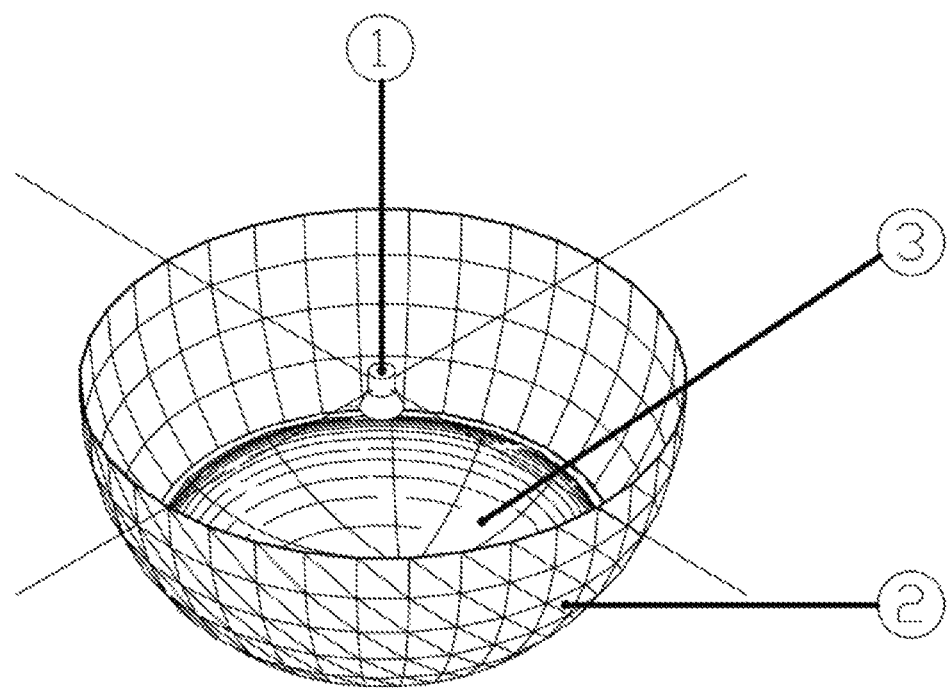
FIG. 1 is illustrating first embodiment of an electromagnetic wave or sun beam concentrator where a parabolic dish is impeded in a Hemisphere.

In one embodiment of the invention as shown in FIG. 1, a parabolic dish (3) is impeded in a hemisphere. The focal point of the parabolic dish coincides with the center of the sphere (1) where the hemisphere is actually half of the sphere. Hereafter, center of the sphere will be referred to as the center of the hemisphere. The center of the hemisphere (1) is at a fixed point to the ground. Therefore regardless of the of the way the hemisphere rotates around its center, the focal point of the parabolic dish remains the same as the center of the sphere (that is fixed to the ground) for any beam that is normal to cross sectional plane of the sphere or the parabolic dish. To concentrate the solar beam, telecommunication signal, and other electromagnetic signals to the receiver, one only needs to rotate the sphere around its center so that the solar beam or the electromagnetic signal is perpendicular to the plane of the center of the hemisphere.

FIG. 2.a is demonstration of one aspect of the first embodiment wherein a solar beam (or electromagnetic signal) (4) is incident normally to the cross sectional area of the Hemisphere (2) and therefore normal to the parabolic dish impeded in hemisphere (3). The parabolic dish will concentrate solar beam to the focal point (1) which coincides with the center of the Hemisphere.

As the solar beam (or electromagnetic signal) changes its direction, the hemisphere will rotate around its center as shown in FIG. 2.b to normally face the beam. Consequently, the beam will be normally facing the parabolic dish which in turn will concentrate it to the focal point that is the same as the center of the Hemisphere. As mentioned this focal point is fixed to the ground. Therefore regardless of the direction of the solar (or signal) beam, the parabolic dish will focus it to the fixed focal point which is also the center of the Hemisphere. All that is needed to rotate the hemisphere around its center to face the solar beam normally to the hemispherical plane or parabolic curvature. The hemisphere can really exist or can be fictional.

Figure 3:
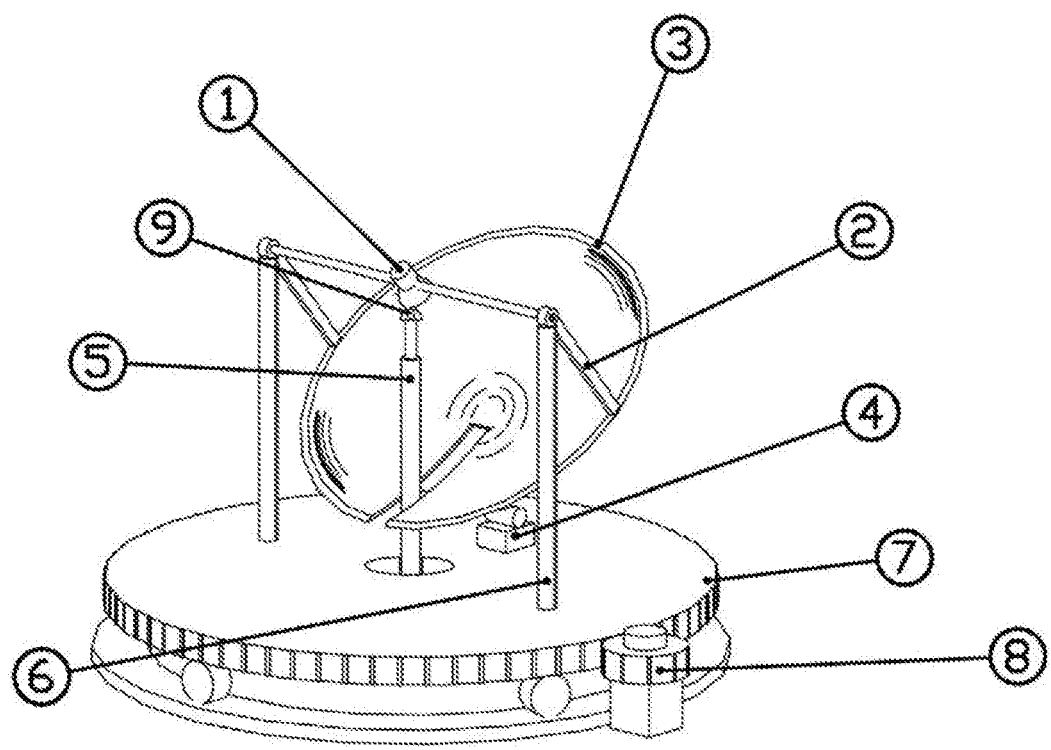
FIG. 3 illustrates the isometric view of another embodiment of the invention which involves a parabolic reflecting dish along with tracking system with the fixed focal point.
Figure 4:
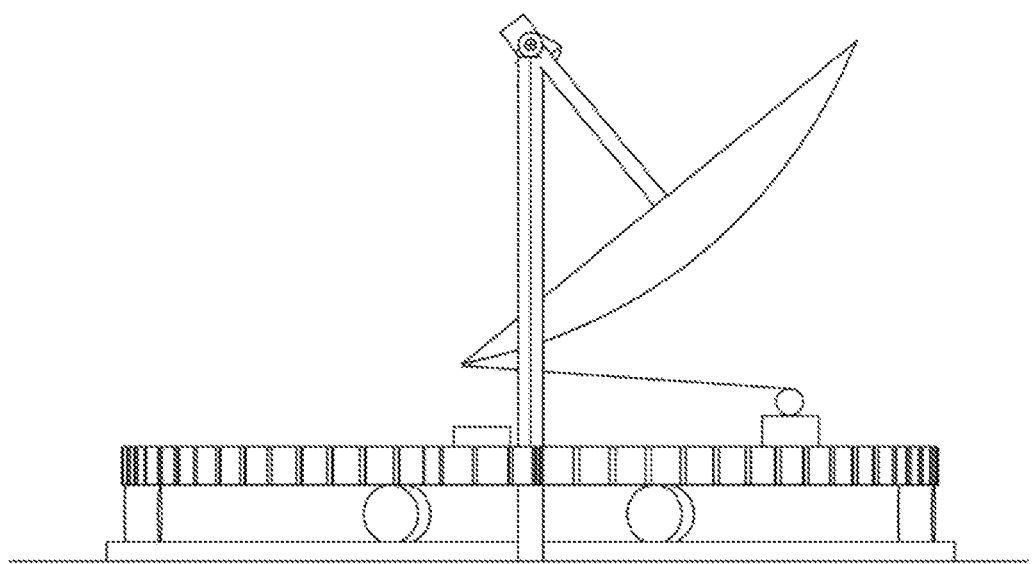
FIG. 4 illustrates a side view of the embodiment shown in FIG. 3 with tilt angle between Zero and Ninety degrees.

FIG. 3 is another embodiment of the present invention showing an isometric view of parabolic dish tracking system with the fixed focal point. In this embodiment, the parabolic dish (3) is held by two arms (2) that are freely joined to a support (6). The two supports (6) are fixed on a platform, preferably, circular platform (7) placed on wheels and rotates either clockwise or counters clockwise as controlled by a side motor (8). This can be a pinion-gear mechanism or a pulley-built mechanism or any other known method of rotation. The rotation of this platform will follow the azimuth angle of the sun. The parabolic Dish (3) supported by the arms (2) is free to swing around the free joints of the supports (6). To control this motion of the parabolic dish, a rope is connected to opposite edge of the dish and other end is wrapped around a platform motor (4) fixed to the circular platform (7). FIG. 4 provides a better view of the rope. By pulling or releasing the rope, the platform motor (4) will control the tilt angle of the dish to match that of the sun. Therefore, by rotating the circular platform (7) controlled by the side motor (8) and pulling or releasing the rope controlled by the platform motor (4) the parabolic dish will always be normally facing the sun through any known control mechanism of motors (4) and (8) as discussed. A receiver (1) for example but are not limited to a photo voltaic system, furnace, transceiver, or other electromagnetic wave tracking systems, is located at the focal point of the parabolic dish (3) which is the same of the center of an imaginary Hemisphere. Consequently, as long as the parabolic dish faces the sun normally due to the controls of motors (4) and (8), the sun will always be concentrated on the fixed focal point at the receiver (1). The receiver is supported on the ground by a support (5) having a passageway, which is circulating a material to the receiver and/or from it. The material can be a fluid to move the turbine for example but are not limited to combined cycle gas turbine etc. Instead of burning fuel to increase the compressed air temperature in the burning chamber, the compressed air is allowed to flow to the fixed location focal point to be heated to the high temperatures and then flow back to turbine stage. This heated air is further used to boil the water to steam to run the steam turbine. This will result in a very high efficiency solar electricity generation. The passage can also be used for circulating materials for example metals and non metals. For continuous metal melting, the support can also contain passages for uploading the solid metal to the receiver and allowing for the melted metal to flow away from the receiver. The high temperature resulting in a fixed point by the methods described can also be used for thermal hydrogen generation from water and other thermo chemical storage applications of solar energy. The Parabolic Dish (3) has a slot slightly larger than the dimensions of support (5) allowing it to swing freely as clearly demonstrated in FIG. 3. Furthermore, the receiver can be forced to always face the dish if needed by placing it on a three dimensional pivot (9) and connected to the rod (10) that rotates with the tilt angle of the dish. This will guarantee that the receiver will always normally receive the concentrated solar beam, the telecommunication signal, or any other electromagnetic signal. This is especially important for certain cases such as if the receiver is a Sterling Engine. On the other hand, the support can also be from the top of the dish rather from the bottom for any needed applications.

FIG. 4 is a side view of the isometric shown in FIG. 3 with tilt angle between Zero and Ninety degrees.

Figure 5:
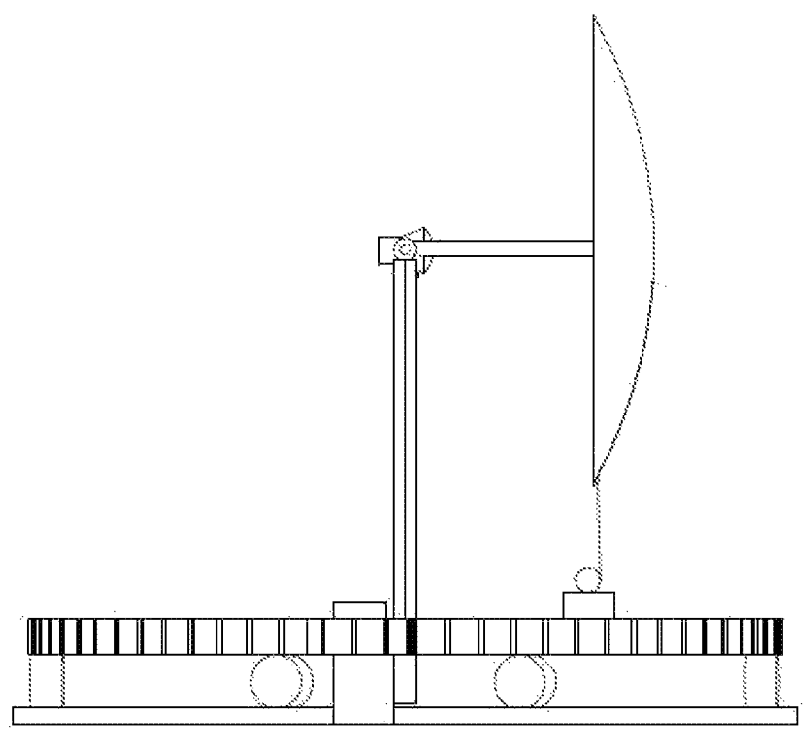
FIG. 5 illustrates a side view of the embodiment shown in FIG. 3 with tilt angle of Ninety degrees.

FIG. 5 is a side view of the isometric shown in FIG. 3 with tilt angle of Ninety degrees and it can be easily imagined the position of the system when the sun is normal to the ground.

Figure 6:
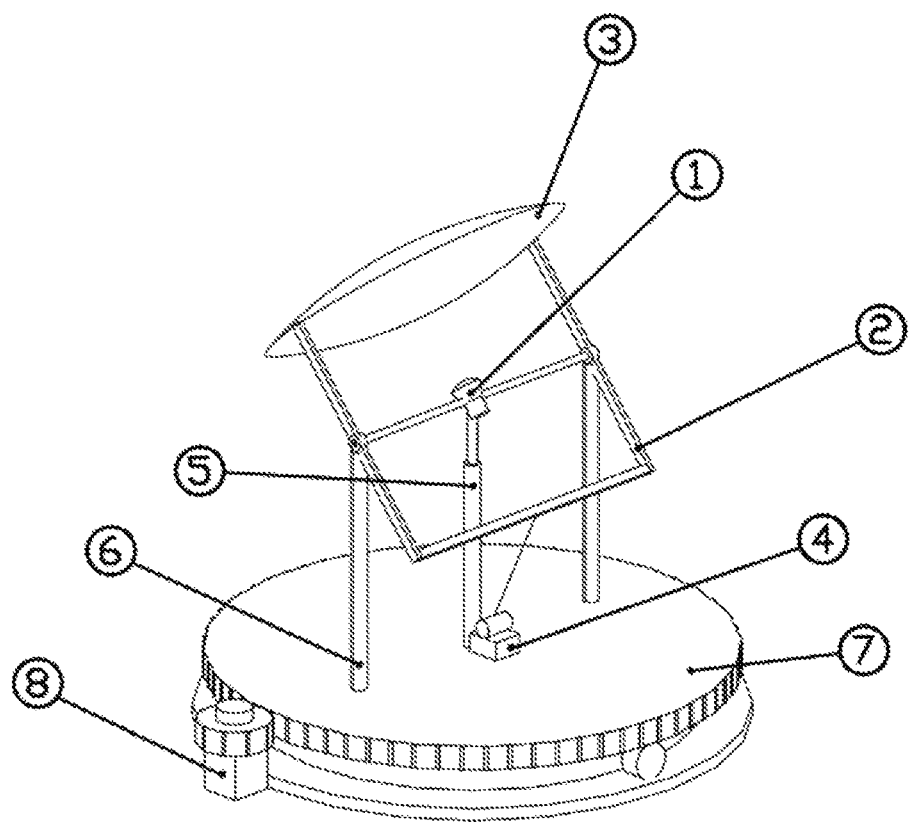
FIG. 6 illustrates another embodiment of the invention showing an isometric view of a practical design for a concentrating lens tracking system with a Fixed Focal point.

FIG. 6 is another embodiment of the invention showing an isometric view of a practical design for a concentrating lens tracking system with a fixed focal point. In many cases solar beams need to be concentrated from above to a receiver in the bottom. In that case a concentrating lens is used. The lens can either be smoothed or Fresnel lens. An electromagnetic wave concentrating system similar to the one described for the parabolic dish is shown in FIG. 6. Similar to what was described in FIG. 3 earlier, receiver (1), connecting arms (2), rope controlling platform motor (4), receiver support (5), supports (6), platform (7) and side motor (8) are the same as that were described earlier with the same function. However, the parabolic Dish (3) in FIG. 3 that swings from under the receiver (1) is replaced with a concentrating lens (3) in FIG. 6 that swings above the receiver concentrating the solar beam directly on it. The location of motor (4) in FIG. 6 is different from its location in FIG. 3, FIG. 4, and FIG. 5. As motors (4) and (8) in FIG. 6 control the position of the lens to be always normal to the solar beam, the lens will concentrate the sun on the receiver (1) at the fixed focal point. Similarly receiver (1) can either be rigid or be pivoted on a three dimensional pivot to force it to normally face the concentrating lens.

The Tracking System and apparatus illustrated in the present invention built for the electromagnetic wave concentration device, such as but not limited to reflecting Parabolic Dish Concentrator or Concentrating Lens, which maintains fixed focal point has many applications that cannot be obtained conventionally. For solar applications the methods described in FIG. 3 and FIG. 4 allow for continuous metal melting as the support can also contain passages for uploading the solid metal to the receiver and allowing for the melted metal to flow away from the receiver. Another important application is that these methods can be used for combined cycle gas turbine. Instead of burning fuel to increase the compressed air temperature in the burning chamber, the compressed air is allowed to flow to the fixed location focal point to be heated to the high temperatures and then flow back to turbine stage and as it exhausting a steam can be boiled similar to any combined cycle steam turbine. This will result in a very high efficiency solar electricity generation. The high temperature resulting in a fixed point by the methods described can also be used for thermal hydrogen generation from water and other thermo chemical storage applications of solar energy. Furthermore, since the focal point can be supported in this invention the current tracking parabolic dish can be used for large scale power generation using heavy sterling engine which was not feasible in a moving focal point system.

It will be appreciated that variations of the above disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An electromagnetic wave concentrating device comprising:
   a refractive concentrating lens configured to concentrate incoming electromagnetic waves at a single fixed focal point;
   a receiver configured to be positioned at the single fixed focal point to receive the concentrated incoming electromagnetic waves, the receiver is centered within the electromagnetic wave concentrating device's axis of rotation;
   a first arm and a second arm configured to hold the refractive concentrating lens, each arm is joined to a support having a joint, the joints of the supports are configured to allow the refractive concentrating lens to swing above the receiver, the two arms are configured to: position the refractive concentrating lens so that the signal fixed focal point thereof is always on the receiver while a moving source of electromagnetic waves is available, and keep the refractive concentrating lens positioned between the moving source of electromagnetic waves and the receiver;
   a rotating platform configured to support the first arm and the second arm holding the refractive concentrating lens; and
   a side motor configured to: rotate the platform to follow the azimuth angle of the moving source of electromagnetic waves, and rotate the refractive concentrating lens about the single fixed focal point;
   wherein the moving source of electromagnetic waves is the sun.

2. The electromagnetic wave concentrating device of claim 1, wherein the refractive concentrating lens is a Fresnel lens.

3. The electromagnetic wave concentrating device of claim 1, wherein the receiver is configured to make use of the concentrated electromagnetic waves.

4. The electromagnetic wave concentrating device of claim 1, wherein the receiver is configured for three-dimensional movement by using a pivot, the pivot is configured to rotate the receiver around an axis that follows the tilt angle of the refractive concentrating lens.

5. The electromagnetic wave concentrating device of claim 1, wherein the receiver is connected to a support, the support includes a passage configured to circulate material to and from the receiver.

6. The electromagnetic wave concentrating device of claim 1, wherein the side motor may be selected from the group consisting of a pinion-gear mechanism, and a pulley-built mechanism.

7. The electromagnetic wave concentrating device of claim 3, wherein the receiver is a metal smelter that is heated by the concentrated electromagnetic waves, solid metal is fed into the metal smelter by a conveyor belt and liquid metal flows away from the receiver through a separate passage in a support on which the receiver is secured.

8. The electromagnetic wave concentrating device of claim 3, wherein the receiver is the combustion chamber of a combined cycle gas turbine, the combustion chamber is configured to use the electromagnetic waves concentrated thereon to raise the temperature of compressed air contained therein.

9. The electromagnetic wave concentrating device of claim 3, wherein the receiver is a portion of a Sterling Engine.

10. The electromagnetic wave concentrating device of claim 3, wherein the receiver is configured to use heat resulting from the electromagnetic waves concentrated thereon to split water into hydrogen and oxygen.

* * * * *